US012632283B2

(12) United States Patent
Chester et al.

(10) Patent No.: US 12,632,283 B2
(45) Date of Patent: May 19, 2026

(54) ISOLATION ENFORCEMENT IN COMPUTING NODE CLUSTERS

(71) Applicant: Oracle International Corporation, Redwood Shores, CA (US)

(72) Inventors: Alan Chester, Cary, NC (US); Ayman Mohamed Aly Hassan Elemenshawy, Bellevue, WA (US); Karl Heiss, Raleigh, NC (US); Joshua Horwitz, Centreville, VA (US); Abhinav Mishra, Livermore, CA (US); Olgierd Pieczul, Dublin (IE); Praveen Kumar Muralidhar Rao, Bellevue, WA (US); Rishabh Ramakant Tulsian, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/645,719

(22) Filed: Apr. 25, 2024

(65) Prior Publication Data

US 2025/0335228 A1      Oct. 30, 2025

(51) Int. Cl.
*H04L 9/40* (2022.01)
*G06F 9/455* (2018.01)

(52) U.S. Cl.
CPC ........ *G06F 9/45558* (2013.01); *H04L 63/105* (2013.01); *G06F 2009/45587* (2013.01)

(58) Field of Classification Search
CPC ....... G06F 9/45558; G06F 2009/45587; H04L 63/105
See application file for complete search history.

(56) References Cited

U.S. PATENT DOCUMENTS

| | | | |
|---|---|---|---|
| 10,057,273 B1 * | 8/2018 | Chakraborty | ....... H04L 67/1044 |
| 2016/0110295 A1 * | 4/2016 | Hashimoto | ......... G06F 12/0238 |
| | | | 713/189 |

(Continued)

FOREIGN PATENT DOCUMENTS

WO      2023/059339 A1      4/2023

OTHER PUBLICATIONS

"Etcd client design", May 21, 2024, pp. 14.

(Continued)

*Primary Examiner* — Meng Vang
(74) *Attorney, Agent, or Firm* — Invoke

(57) ABSTRACT

Techniques are disclosed for enforcing isolation in a cluster of computing nodes configured for executing containerized applications. The system receives a request from a requesting entity for access to a target namespace. The request is accompanied by a token. Based on the token, the system identifies a namespace that corresponds to an isolation namespace. To determine if the request is attempting to breach isolation, the system compares the target namespace to the corresponding namespace. If the target namespace is not the corresponding namespace, the system concludes that the request is attempting to breach isolation, and, therefore, denies the request. If the request is not attempting to breach isolation, the system determines if the request is allowed by any permissions that have been granted to the requesting entity. If the request is not allowed by a permission granted to the request entity, the system denies the request.

25 Claims, 9 Drawing Sheets

(56) References Cited

U.S. PATENT DOCUMENTS

| | | | |
|---|---|---|---|
| 2018/0089101 A1* | 3/2018 | Sternberg ............ | G06F 9/45533 |
| 2019/0227718 A1* | 7/2019 | Frolikov ................. | G06F 21/80 |
| 2020/0117743 A1* | 4/2020 | Shilimkar ........... | G06F 9/45558 |
| 2023/0107891 A1* | 4/2023 | Miriyala ............. | G06F 9/45558 |
| | | | 370/254 |

OTHER PUBLICATIONS

Anonymous : "Authenticating : Kubernetes", Kubernetes Documentation, Retrieved from https://web.archive.org/web/20240424060316/https://kubernetes.io/docs/reference/access-authn-authz/authentication/, Retrieved on Nov. 3, 2025, pp. 1-26.
Tsap V., "How to Grant User Access to Particular Name space", Retrieved from https://web.archive.org/web/20240415222818/https://shalb.com/devops-methods-practices/how-to-grant-user-access-to-particular-namespace/, Mar. 27, 2024, pp. 1-8.

* cited by examiner

600

ISOLATION ENFORCEMENT IN COMPUTING NODE CLUSTERS

TECHNICAL FIELD

The present disclosure relates to enforcing isolation within a cluster of computing nodes.

BACKGROUND

The may be multiple user associated with a cluster of computing nodes that is configured for executing containerized applications. The multiple users of the cluster may include human users and/or non-human users. Examples of human users of the cluster may include administrators of the cluster and/or a customer that is vended a portion of the cluster. A customer that is vended a portion of the cluster may be an administrator of the portion of the cluster. A portion of the cluster that is vended to a customer may host sensitive resources and/or other sensitive information of the customer. Examples of non-human users of the cluster may include a component of the cluster (e.g., an application executing in the cluster) and/or external systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the Figures of the accompanying drawings. References to "an" or "one" embodiment in this disclosure are not necessarily to the same embodiment, and they mean at least one. In the drawings.

DETAILED DESCRIPTION

Figure 1:
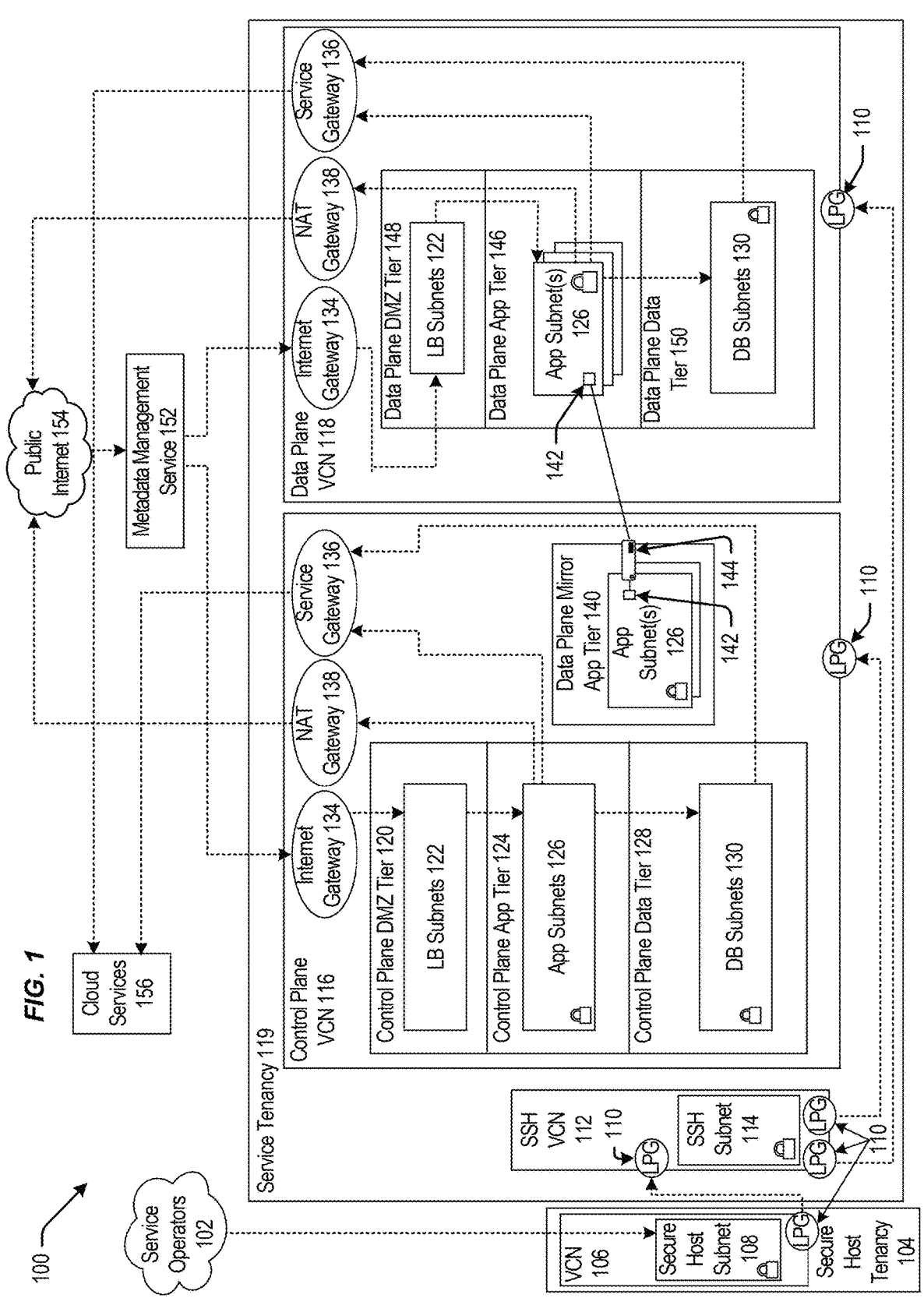
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

The following table of contents is provided for the reader's convenience and is not intended to define the limits of the disclosure.

1. GENERAL OVERVIEW
2. CLOUD COMPUTING TECHNOLOGY
3. COMPUTER SYSTEM
4. NAMESPACE ISOLATION SYSTEM
5. IMPLEMENTING ISOLATION
6. ENFORCING ISOLATION
7. EXAMPLE EMBODIMENT
8. MISCELLANEOUS; EXTENSIONS

1. GENERAL OVERVIEW

One or more embodiments enforce isolation along the boundaries of namespace that is associated with a cluster of computing nodes configured for executing containerized applications.

A "standard namespace," as referred to herein, is a mechanism for organizing resources of a cluster of computing nodes configured for executing containerized applications. Some standard namespaces of a cluster of computing nodes are associated with isolation namespaces. An "isolation namespace" is a mechanism for enforcing isolation in the cluster. An isolation namespace is associated with the same set of namespaced resources as a corresponding standard namespace. If a standard namespace is associated with an isolation namespace, the system enforces isolation on the standard namespace.

An embodiment enforces isolation by selectively denying requests that attempt to cross the boundaries of an isolation namespace. The isolation namespace corresponds to a standard namespace of a cluster of computing nodes. The boundaries of the isolation namespace are the same as the boundaries of the corresponding namespace. The system may deny requests that originate from the corresponding namespace. Furthermore, the system may deny requests that attempt to access the corresponding namespace. However, the system does not deny every request that attempts to cross the boundaries of the isolation namespace.

An embodiment denies a service account request that originates from a standard namespace corresponding to an isolation namespace if the service account request is attempting to access any standard namespace other than the originating namespace. In an example, the system receives a service account request from a requesting entity for access to a target namespace. The requesting entity is a component of a cluster of computing nodes. The requesting entity is associated with a standard namespace of the cluster. The standard namespace of the requesting entity is the originating namespace of the request. The request is accompanied by a service account token. The service account token indicates a service account name, and the service account name contains a unique identifier of the originating namespace. Based on the unique identifier of the originating namespace, the system determines that the originating namespace corresponds to an isolation namespace. The system compares the target namespace to the originating namespace and determines that the target namespace is not the originating namespace. Consequently, the system denies the request.

An embodiment denies a request from a requesting entity if the requesting entity does not have permission to access an isolation namespace that is specified in a user token that accompanies the request. In an example, the system receives a request from a requesting entity for access to a target namespace. The requesting entity is a human user or a non-human user. The request is accompanied by a user token. The user token includes a signature, and the signature includes a unique identifier of an isolation namespace. Based on the unique identifier of the isolation namespace, the system determines that the requesting entity is not permitted to access the isolation namespace. Consequently, the system denies the request.

An embodiment denies a request for access to a standard namespace if the standard namespace does not correspond to an isolation namespace that is specified in a user token that accompanies the request. In an example, the system receives a request from a requesting entity for access to a target namespace. The requesting entity is a human user or a non-human user. The request is accompanied by a user token. The user token includes a signature, and the signature includes a unique identifier of an isolation namespace. Based on the unique identifier of the isolation namespace, the system determines that the requesting entity is permitted to access the isolation namespace. Based on the unique identifier, the system accesses namespace metadata associated with the isolation namespace to identify a particular namespace that corresponds to the isolation namespace. The system compares the target namespace to the particular namespace and determines that the target namespace is not the particular namespace. Consequently, the system denies the request.

An embodiment denies a request that is attempting to breach the isolation of an isolation namespace even if other access control mechanisms allow the request. In an example, the system receives a request from a requesting entity that is attempting to access a target namespace of a cluster of computing nodes. The requesting entity has a set of permissions granted by an access control mechanism(s) of the cluster. A permission that has been granted to the requesting entity allows the requesting entity to access the target namespace. However, the request is attempting to breach the isolation that is imposed by an isolation namespace. Consequently, the system denies the request.

An embodiment denies a request that is not attempting to breach the isolation of an isolation namespace if no other access control mechanism allows the request. In an example, the system receives a request from a requesting entity that is attempting to access a target namespace of a cluster of computing nodes. The request is not attempting to breach the isolation that is imposed by any isolation namespace of the cluster. The requesting entity has a set of permissions that allow the requesting entity to access the cluster. However, none of the permissions granted to the requesting entity allow the requesting entity access to the target namespace. Consequently, the system denies the request.

One or more embodiments described in this Specification and/or recited in the claims may not be included in this General Overview section.

2. CLOUD COMPUTING TECHNOLOGY

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment, such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on one another, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
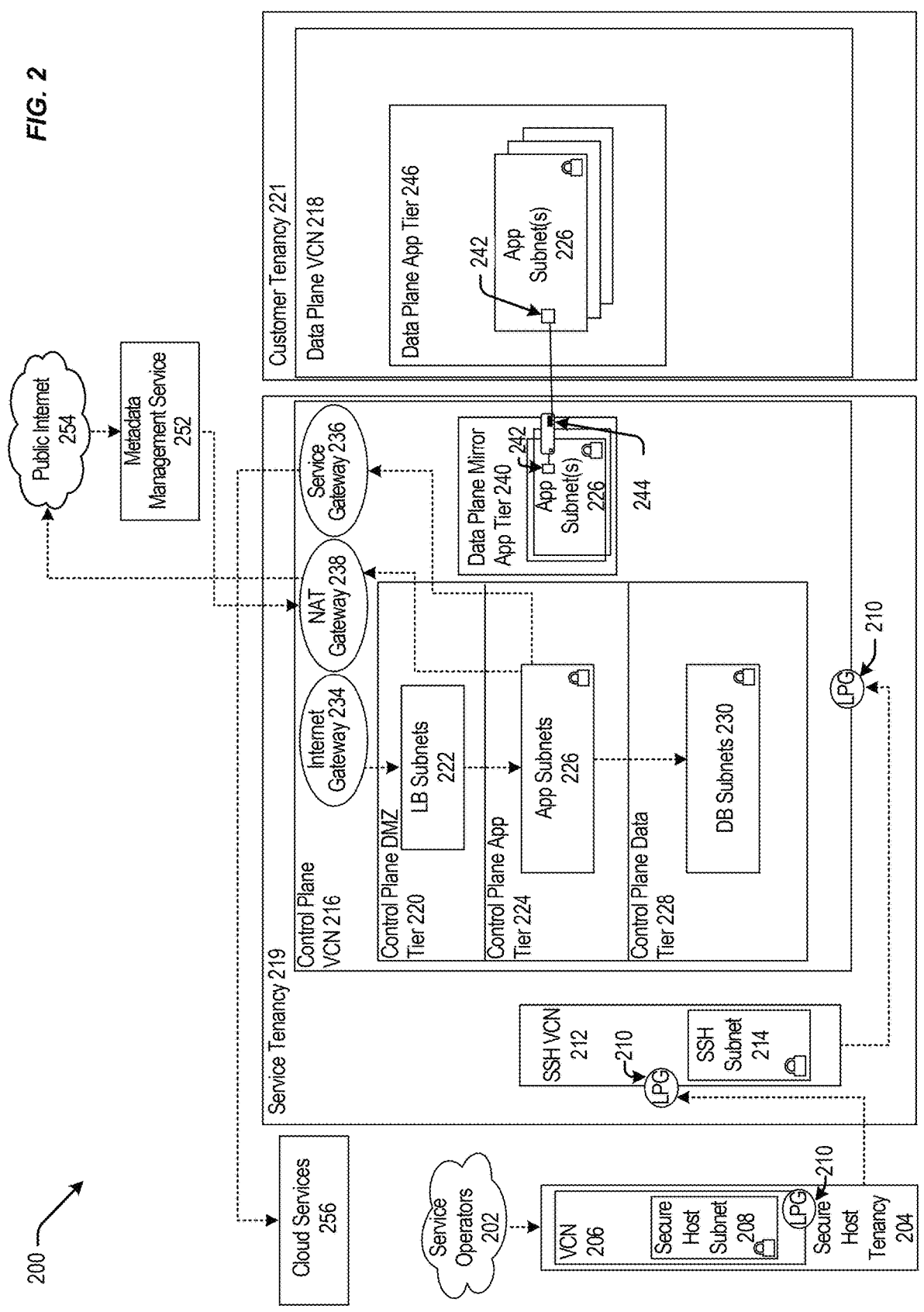

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
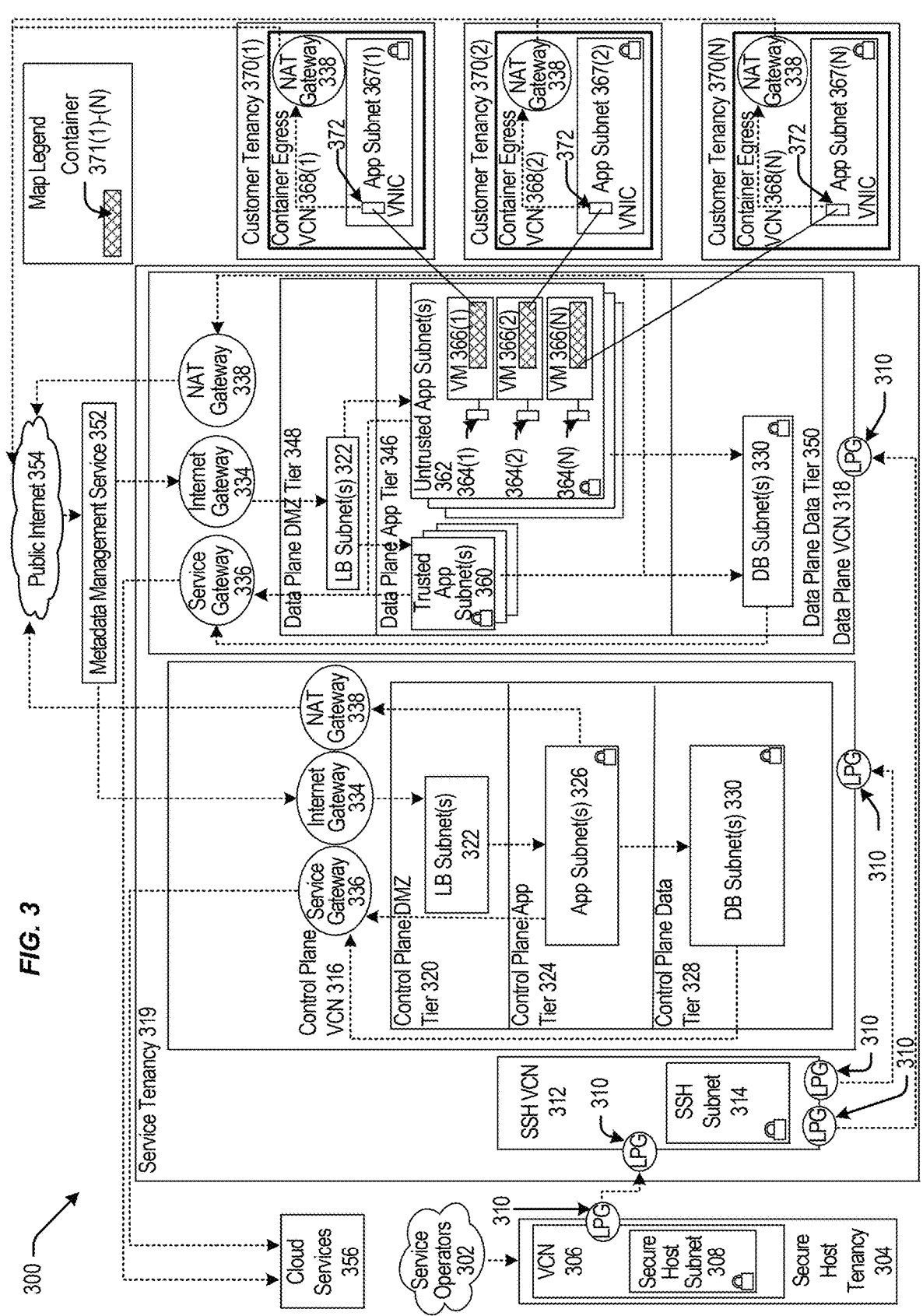

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
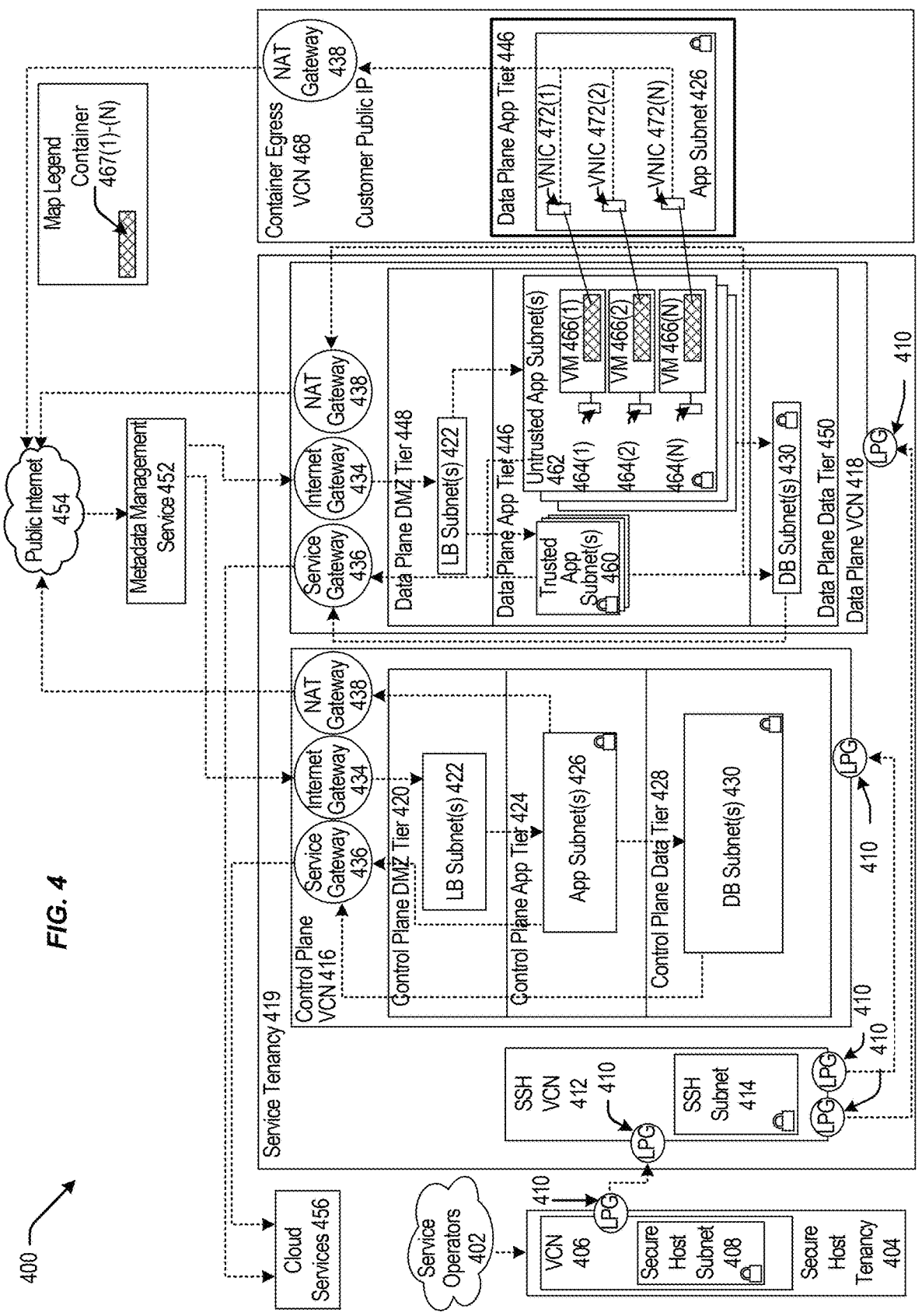

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICS 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited, to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities. The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource when the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset when the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for each tenant, a set of applications that the tenant is authorized to access. For each application, a list of tenant IDs of tenants authorized to access the application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

This application may include references to certain trademarks. Although the use of trademarks is permissible in patent applications, the proprietary nature of the marks should be respected and every effort made to prevent their use in any manner that might adversely affect their validity as trademarks.

3. COMPUTER SYSTEM

Figure 5:
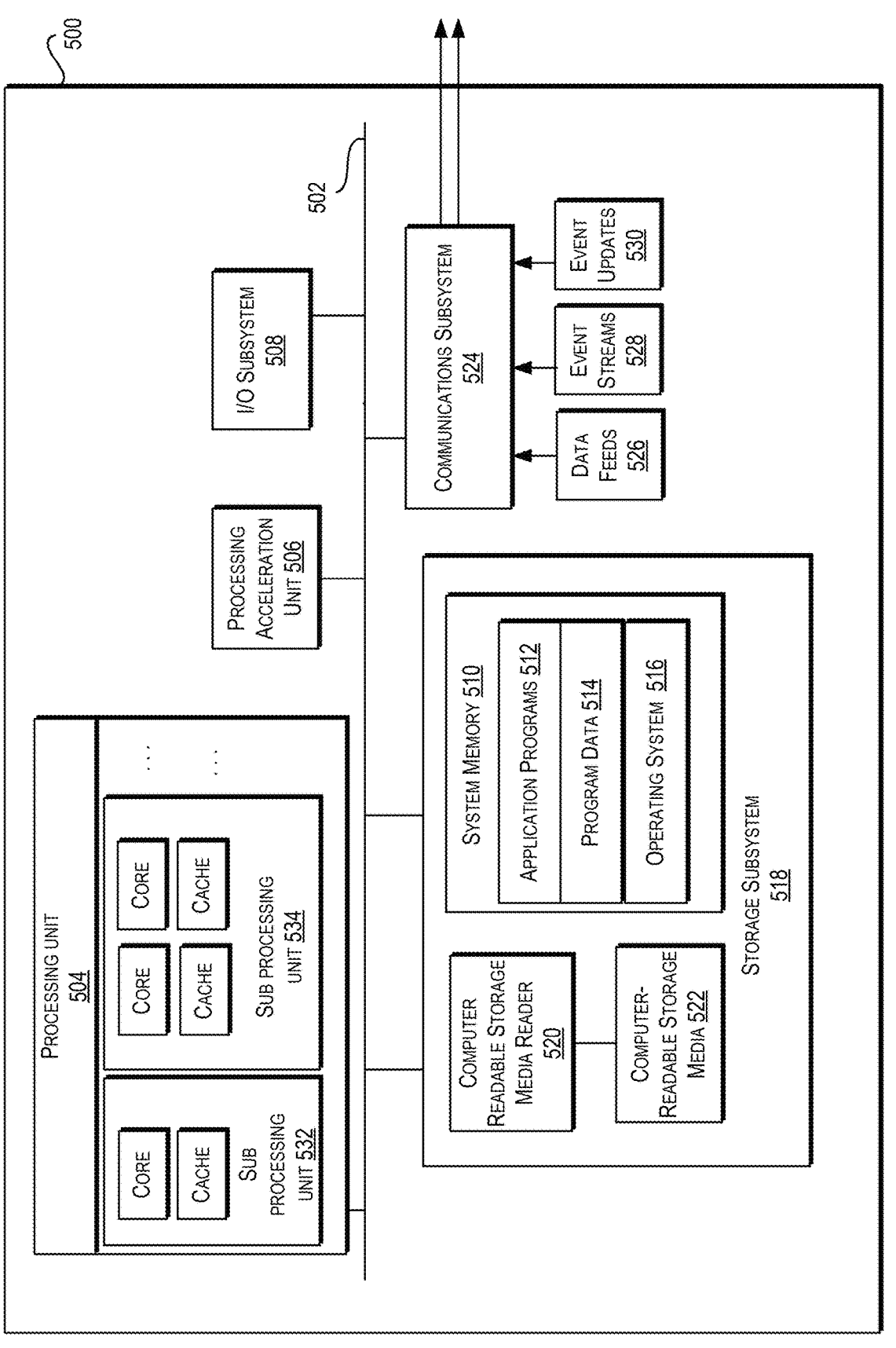
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with each other as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics and audio/video information, such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided, including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), click-stream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. NAMESPACE ISOLATION SYSTEM

Figure 6:
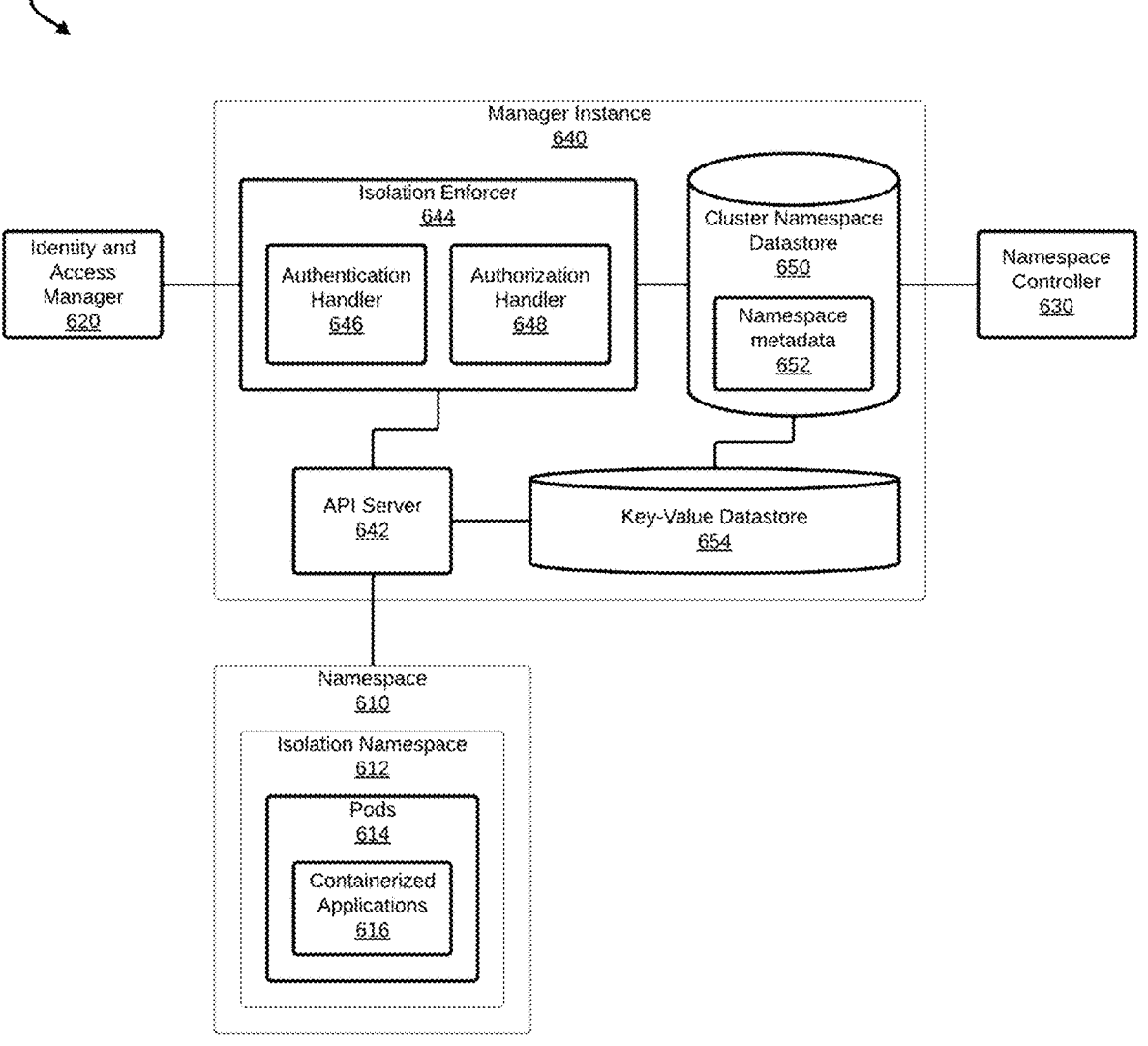
FIG. 6 illustrates a standard namespace isolation system in accordance with one or more embodiments.

FIG. 6 illustrates a system 600 in accordance with one or more embodiments. As illustrated in FIG. 6, system 600 includes namespace 610, identity and access manager 620, namespace controller 630, and manager instance 640. In one or more embodiments, the system 600 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

In one or more embodiments, system 600 refers to hardware and/or software configured to perform operations described herein for implementing and/or enforcing isolation within a cluster of computing nodes configured for executing containerized applications. The cluster of computing nodes may be associated with multiple users. As used herein, a "user" refers to a human user or a non-human user. A user that requests some form of access to the cluster is referred to herein as a "requesting entity." The system 600 may enforce isolation within the cluster by denying a request from a requesting entity. A request from a requesting entity optionally targets a standard namespace of the cluster. As used herein, a standard namespace that is targeted by a request is referred to as a "target namespace." A request that targets a target namespace need not indicate the target namespace in the request. A request from a requesting entity optionally targets a component of the cluster. As used herein, a component that is targeted by a request is referred to as a "target resource." A target resource need not be a resource. A request that targets a target resource need not indicate the target resource in the request. A Kubernetes cluster is an example of a cluster of computing nodes configured for executing containerized applications. Examples of operations for implementing isolation in the cluster are described below with reference to FIG. 7. Examples of operations for enforcing isolation in the cluster are described below with reference to FIG. 8.

In an embodiment, namespace 610 is a standard namespace. A standard namespace is a mechanism for organizing components of a cluster of computing nodes. A standard namespace may be more simply referred to as a "namespace." Namespace 610 is associated with a subset of the components of the cluster. Namespace 610 is associated with API resources, compute resources, other types of resources, and/or other components of the cluster. An "API resource" refers to a representation of a type of object or an operation on an object. Examples of API resources that may be associated with namespace 610 include, a pod, a service, a deployment, a service account, a persistent volume, a replica set, a configuration map, a secret, and others. A "compute resource" refers to a measurable quantity that can be requested, allocated, and/or consumed. Compute resources are allocated to and consumed by applications running on resources of namespace 610. Namespace 610 corresponds to isolation namespace 612. As used herein, a "corresponding namespace" refers to a standard namespace that corresponds to an isolation namespace. Thus, namespace 610 may be referred to as a corresponding namespace. As illustrated in FIG. 6, namespace 610 includes pods 614. Components of namespace 610 are communicatively coupled to components of manager instance 640 and/or other components of system 600.

In an embodiment, isolation namespace 612 is a mechanism for enforcing isolation in a cluster of computing nodes. System 600 can enforce isolation in the cluster by selectively denying requests that attempt to cross the boundaries of isolation namespace 612. The boundaries of isolation namespace 612 are the boundaries of namespace 610. However, in another embodiment, an isolation namespace may encompass multiple namespaces, portion(s) of namespaces, and/or components of the cluster that do not reside in a standard namespace. It should be noted that the cluster of computing nodes may include multiple namespaces and multiple corresponding isolation namespaces; however, there need not be an isolation namespace for every standard namespace of the cluster. A user may be permitted to access multiple isolation namespaces; however, a user may not access any two isolation namespaces of the cluster simultaneously.

In an embodiment, pods 612 are hosted by a cluster of computing nodes. Pods 612 are resources of namespace 610. Pods 612 serve as an execution environment for containerized applications 614. Pod 612 may be associated with service accounts. A service account is a resource that provides an identity for non-human users of the cluster. A non-human user of the cluster can use the credentials of a service account to request access to another component of the cluster or a component of an external system. A request that is based on credentials of a service account is referred to herein as a "service account request." In an example, a service account token is mounted as a secret to a pod 612. The service account token is a JavaScript Object Notation (JSON) web token or another credentials format. A non-human user of the cluster may utilize the service account token to request access to another component of the cluster (e.g., a resource of namespace 610).

In an embodiment, containerized applications 614 are software applications packaged into containers. Software applications can be packaged into containers with dependencies that that might be needed to run the software application. Example dependencies of a software application that might be packaged into a container with the software application include libraries, binaries, configuration files, frameworks, and/or other information. Containerized applications 614 can be executed in any computing environment that supports the container format. Examples of container formats include Docker containers, Linux containers, Solaris containers, and other formats. A containerized application 614 executing on a pod 612 is an example of a non-human user that can use a service account token mounted to a pod 612 to request access to another component of the cluster.

In an embodiment, identity and access manager 620 is configured to provide access control to a computer environment. Identity and access manager 620 administers identity and access management (IAM) policies. IAM policies may be registered with or "attached" to a principal or a group of principals (referred to herein as an "IAM group"). A principal may be a human user or a non-human user. An example IAM policy statement may specify an IAM group, a privilege (e.g., inspect, read, use, manage, etc.), a resource type, a location, conditions, and/or other information. A user of system 600 may interact with identity and access manager 620 to define IAM policies. Identity and access manager 620 may determine if a requesting entity is a principal that is attached to an IAM policy. As used herein, an "IAM request" refers to any request that is evaluated based on IAM policies. Identity and access manager 620 is communicatively coupled to components of manager instance 640 and/or other components of system 600.

In an embodiment, identity and access manager 620 is configured to administer IAM policies that are written against a cluster of computing nodes. For example, an IAM policy administered by IAM manager 620 may grant a set of permission(s) within the cluster to a principal that is a human user or a non-human user of the cluster. The IAM policies administered by identity and access manager 620 may work in concert with role based access control (RBAC) policies of the cluster. For instance, a permission that is granted by an IAM policy may be mapped to a group of the cluster, and the group of the cluster may be bound to an RBAC cluster role or an RBAC role. An RBAC cluster role grants a set of permission(s) in the cluster (i.e., actions that can be performed anywhere in the cluster). An RBAC role grants a set of permission(s) in a standard namespace of the cluster. A subject is bound to an RBAC cluster role by an RBAC cluster role binding. Similarly, a subject is bound to a RBAC role by an RBAC role binding. In an example, an IAM policy administered by identity and access manager 620 grants a manage permission for the cluster to a principal, the manage permission is mapped to a masters group of the cluster, and the masters group of the cluster is bound to an administrator RBAC cluster role that grants administrator-level permissions in the cluster. Thus, in this example, the principal is granted administrator-level permissions in the cluster as a result of being granted the manage permission by the IAM policy administered by identity and access manager 620. It should be noted that RBAC cluster roles and/or RBAC roles can be bound to various other subjects. For instance, in another example, an RBAC role is bound to a service account.

In an embodiment, identity and access manager 620 is configured to administer IAM policies that are written against isolation namespace(s) of a cluster of computing nodes. An IAM policy written against an isolation namespace grants a permission(s) for the isolation namespace. For instance, an example IAM policy grants a principal an insect, read, use, or manage permission for an isolation namespace. A permission for an isolation namespace that is granted by an IAM policy may be mapped to a namespace-specific group of a standard namespace that corresponds to the isolation namespace. In an example, an IAM policy grants a principal a manage permission for an isolation namespace, the manage permission is mapped to an administrator group of a corresponding namespace, and the administrator group of the corresponding namespace is bound to an administrator RBAC role that grants administrator-level permissions in the corresponding namespace. Thus, in this example, the principal is granted administrator-level permissions in the corresponding namespace as a result of being granted the manage permission for the isolation namespace by the IAM policy administered by identity and access manager 620.

In an embodiment, namespace controller 630 is a control loop that is configured to monitor a cluster of computing nodes. In particular, namespace controller 630 is configured to detect changes to the configuration of isolation namespaces associated with the cluster. Namespace controller 630 resides in a cloud infrastructure management plane of system 600. Namespace controller 630 is communicatively coupled to components of manager instance 640 and/or other components of system 600. Namespace controller 630 can utilize a peering mechanism to establish a connection to manager instance 640 and/or other components of the cluster. Namespace controller can create new resources on manager instance 640 and use the new resources to interact with components of the manager instance 640 (e.g., a cluster namespace datastore). Namespace controller 630 is configured to persist namespace metadata to a manager instance of the cluster. For instance, in response to a new isolation namespace being defined (e.g., isolation namespace 612), namespace controller 630 can push namespace metadata associated with the new isolation namespace to a manager instance (e.g., manager instance 640). Namespace controller 630 can create role bindings and/or cluster role bindings. For instance, namespace controller 630 can create a role binding for an administrator RBAC role or a user RBAC role for namespace 610.

In an embodiment, manager instance 640 is a virtual machine instance that hosts components of a control plane and/or data plane of a cluster of computing nodes. An example cluster of computing nodes may be associated with multiple manager instances. As illustrated in FIG. 6, manager instance 640 includes API server 642, isolation enforcer 644, cluster namespace datastore 650, key-value data repository 654, and/or other components. The components of manager instance 640 are configured to perform various operations for the administration of namespace 610, other namespaces of the cluster, and/or other components of the cluster. Components of manager instance 640 are communicatively coupled to components of namespace 610, identity and access manager 620, namespace controller 630, and/or other components of the system 600.

In an embodiment, API server 642 is configured to facilitate communications to and/or from components of a cluster of computing nodes. API server 642 exposes an HTTP API that lets users of the cluster interact with components of the cluster. API server 642 can receive API calls from human user and non-human users (e.g., a containerized application 616). In response to receiving a request for access to the cluster, API server 642 is configured to issue webhook callbacks to isolation enforcer 644 for authentication and/or authorization of the request. API server 642 can share information with isolation enforcer 644 by populating the information to an API resource (e.g., a token review resource and/or subject access review resource).

In an embodiment, isolation enforcer 644 is configured to enforce isolation in a cluster of computing nodes. Isolation enforcer 644 can enforce isolation by selectively denying a request that attempts to cross the boundaries of isolation namespace 610 and/or other isolation namespaces of the cluster. It should be noted that isolation enforcer 644 may allow a request that crosses the boundaries of an isolation namespace 610 if the request is not attempting to breach isolation. As used herein, "allowing a request" refers to refraining from denying the request. A request that is allowed by one component of system 600 may nonetheless be denied by another component of the system 600. Isolation enforcer 644 may deny a request by a requesting entity that is attempting to escape isolation even if the request is allowed by permissions granted to the requesting entity by IAM policies, RBAC policies, attribute-based access control (ABAC) policies, node authorization policies, and/or other access control mechanisms. As illustrated in FIG. 6, isolation enforcer 644 includes authentication handler 646 and authorization handler 648.

In an embodiment, authentication handler 646 is a plugin that includes custom logic for denying certain requests received by API server 642. In particular, the custom logic of authentication handler 646 is configured to deny a request from a requesting entity if the requesting entity is not permitted to access an isolation namespace that is the specified by the request. Authentication handler 646 can access information (e.g., namespace metadata) stored in cluster namespace datastore 650 and can consult with identity and access manager 620 to determine if a requesting entity has permission to access an isolation namespace. Authentication handler 646 is configured to evaluate a request received by API server 642 in response to a webhook callback issued by API server 642. Authentication handler 646 can use an API resource (e.g., token review resource) to send and receive information to API server 642.

In an embodiment, authentication handler 646 can evaluate a request based on a user token that accompanies the request. As used herein, the term "user token" refers to credentials other than a service account token. A user token is distinguished from a service account token for purposes of clarity and explanation, and it should be understood that a user token need not be a token. In an example, a user token is a JSON web token that accompanies an IAM request, a uniform resource locator (URL) is included in a signature of the user token, and the URL includes a unique identifier of an isolation namespace. In another example, a user token may be another credentials format. Examples of other credentials formats include an OAuth 2.0 token, an OpenID Connect Token, a SAML Token, session cookies, basic HTTP authentication credentials, API keys, and/or other mediums.

In an embodiment, authorization handler 648 is a plugin that includes custom logic for denying certain requests received by API server 642. In particular, authorization handler 648 is configured to deny a request that attempts to breach the isolation imposed by an isolation namespace. Authorization handler 646 can access information stored in cluster namespace data store 650 and/or a subject access review resource to determine if a request is attempting to breach isolation. The custom logic of authorization handler 648 is configured to evaluate service account requests, IAM requests, and/or other types of requests. Authorization handler 646 is configured to evaluate a request received by API server 642 in response to a webhook callback issued by API server 642.

In one or more embodiments, cluster namespace datastore (CND) 650 and key-value datastore (KVD) 654 are data repositories. A data repository is any type of storage unit and/or device (e.g., a file system, database, collection of tables, or any other storage mechanism) for storing data. CND 650 and/or KVD 654 may include multiple different storage units and/or devices. The multiple different storage units and/or devices may or may not be of the same type or located at the same physical site. Further, CND 650 and/or KVD 654 may be implemented or executed on the same computing system as other components of system 600. Additionally, or alternatively, a data repository may be implemented or executed on a computing system separate from the other components of system 600. CND 650 and/or KVD 654 may be communicatively coupled to other components of system 600 via a direct connection or via network. CND 650 stores namespace metadata 652. Information describing namespace metadata 652 may be implemented across any of components within the system 600. For instance, KVD 654 also stores namespace metadata 652. However, this information is illustrated within CND 650 for purposes of clarity and explanation.

In an embodiment, CND 650 is configured for caching and serving namespace metadata 652. CND 650 includes a management API and a localhost API. The management API provides namespace controller 630 read and write access to CND 650. The management API may be exposed externally to manager instance 640. The localhost API provides isolation enforcer 644 read-only access to CND 650. The localhost API may be exposed internally to manager instance 640. CND 650 can read from and/or write to KVD 654 using mutual transport layer security (mTLS) credentials, transport layer security (TLS) credentials, and/or other security credentials. CND 650 is configured to periodically read from KVD 654 to watch for updated metadata that is written to KVD 654 by another CND of the cluster. CND 650 is configured to utilize a reflector and informer mechanism of the cluster to execute the periodic reads from KVD 654.

In an embodiment, namespace metadata 652 is information associated with standard namespaces and/or isolation namespaces of a cluster of computing nodes. For instance, namespace metadata 652 may include information describing isolation namespace 612 and namespace 610. In an example, namespace metadata 652 includes unique identifier(s) of isolation namespace 612 (e.g., a name and/or an ID), a compartment ID of isolation namespace 612, a tag slug of isolation namespace 612, unique identifier(s) of namespace 610 (e.g., a name and/or ID), and/or other information. In this example, namespace metadata 652 can be used by authentication handler 646 and/or authorization handler 648 to determine if a request that originates from namespace 610 or targets namespace 610 should be denied. Namespace metadata 654 is also stored to KVD 654. However, by caching namespace metadata 654 in CND 650, the system 600 insulates KVD 654 from frequent reads by isolation enforcer 644.

In an embodiment, KVD 654 is a distributed key-value data repository that is used for backend storage of information. KVD 654 is an instance of a KVD service running across multiple nodes of a cluster of computing nodes. There may be multiple instances of the KVD service residing in multiple manager instance of the cluster. KVD 654 stores information such as namespace metadata 652, API objects, persistent volumes, and/or other information.

In an embodiment, system 600 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, a tenant is a corporation, organization, enterprise, or other entity that accesses a shared computing resource.

5. IMPLEMENTING ISOLATION

Figure 7:
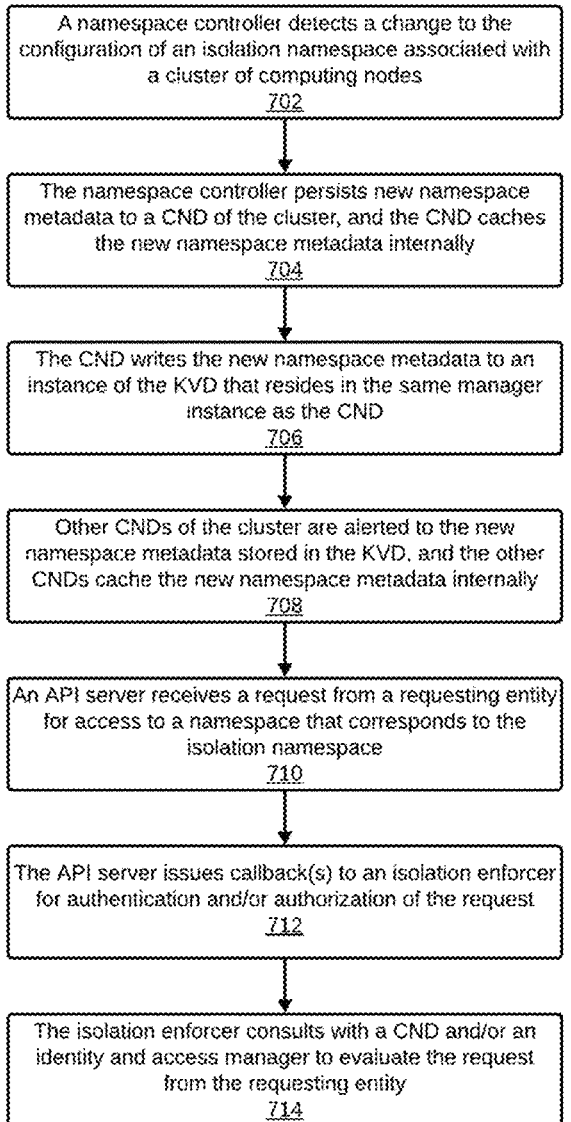
FIG. 7 illustrates an example set of operations for implementing isolation in accordance with one or more embodiments.

FIG. 7 illustrates an example set of operations for implementing isolation in accordance with one or more embodiments. One or more operations illustrated in FIG. 7 may be modified, rearranged, or omitted. Accordingly, the particular sequence of operations illustrated in FIG. 7 should not be construed as limiting the scope of one or more embodiments.

In an embodiment, the system detects a change in the configuration of an isolation namespace (Operation 702). The isolation namespace is associated with a cluster of computing nodes configured for executing containerized applications. The configuration change may be the creation of the isolation namespace, an alteration to the isolation namespace, or the deletion of the isolation namespace. The configuration change is detected by a namespace controller that resides in a cloud infrastructure control plane. The configuration change is associated with new namespace metadata that describes the new configuration of the isolation namespace. In an example, the configuration change is the result of an administrator of the cluster creating the isolation namespace. In this example, the administrator may interact with an identity and access manager of the system to define IAM policies that are written against the isolation namespace. For instance, IAM policies written by the administrator against the isolation namespace may attach an IAM group to a use and/or manage permission for the isolation namespace. Additionally, an administrator may interact with an API server of the cluster to configure RBAC policies that are mapped to the IAM permissions.

In an embodiment, the system persists the new namespace metadata associated with the isolation namespace to a manager instance of the cluster of computing nodes (Operation 704). Specifically, the new namespace metadata is persisted to a CND residing in a manager instance that is associated with the isolation namespace. The cluster may include multiple manager instances and/or multiple isolation namespaces. The new namespace metadata is persisted to the CND by the namespace controller that detected the configuration change to the isolation namespace. The namespace controller may utilize a peering mechanism to establish a connection to the cluster. Having established a connection to the cluster, the namespace controller can utilize a management API of the CND that grants the namespace controller read and write access to the CND. The management API may be exposed externally to the manager instance, and the namespace controller may present an administrator token for authentication and/or authorization of requests by the namespace controller. The namespace controller leverages the management API to persist the new namespace metadata to the CND. The namespace controller may prioritize the persisting of the new namespace metadata over other operations. Prioritizing the persisting of the new namespace metadata enables the new namespace metadata to be present on the cluster soon after the change in the configuration of the isolation namespace occurs. For instance, the new namespace metadata may be present on the cluster even before a standard namespace corresponding to the isolation namespace is created or modified. Upon receiving the new namespace metadata from the namespace controller, the CND of the manager instance caches the new namespace metadata internally. In addition to persisting the namespace metadata, and depending on the nature of the change in configuration, the namespace controller optionally creates RBAC role bindings for the corresponding namespace.

In an embodiment, the system persists the new namespace metadata to a KVD instance of the cluster of computing nodes (Operation 706). The new namespace metadata is persisted to the KVD instance by the CND that receives the new namespace metadata from the namespace controller. Specifically, the CND persists the new namespace metadata to the local instance of the KVD (i.e., the instance of the KVD that resides on the same manager instance as the CND). Upon receiving the new namespace metadata, the namespace metadata stored across the multiple KVD instances of the cluster is updated. Once the namespace metadata stored across the multiple KVD instances has been updated, the new namespace metadata can be accessed by other CNDs residing on other manager instances of the cluster.

In an embodiment, other CNDs of the system are alerted to the update of the namespace metadata stored within the KVD (Operation 708). The other CNDs reside in other manager instances of the cluster. Each CND of the cluster is configured to perform periodic reads of the CND's local KVD instance to watch for updates to namespace metadata stored across the KVD instances of the cluster. The periodic reads are facilitated by a reflector and informer mechanism of the cluster. In response to detecting the change to the namespace metadata stored within the KVD, each CND obtains the new namespace metadata from the CND's local KVD instance and caches the new namespace metadata internally. Once the new namespace metadata is cached to the other CNDs, any isolation enforcer of the cluster can access the new namespace metadata from the isolation enforcer's local CND (i.e., the CND that resides in the same manager instance as the isolation enforcer).

In an embodiment, the system receives a request from a requesting entity for access to a target namespace (Operation 710). The request is received by an API server existing in a manager instance of the cluster. The API server exposes an API that allows the requesting entity to transmit the request to the API server. The request is accompanied by a token. In an example, the request is an HTTP request, and the token is accompanied by a JSON web token. Specifically the JSON web token is included in a header of the request. In this example, the request is a service account request or an IAM request, and the JSON web token is a service account token or a user token.

In an embodiment, the system issues webhook callbacks for authentication and/or authorization of the request (Operation 712). The webhook callbacks are issued by the API server that receives the request from the requesting entity. The webhook callbacks are issued to the API server's local isolation enforcer (i.e., the isolation enforcer residing in the same manager instance as the API server). In an example, the request is a service account request, and the API server issues webhook callback(s) to the isolation enforcer for authorization of the request. Specifically, the API server issues a webhook callback to an authorization handler of the isolation enforcer. The API server may share information with the authorization handler using a subject access review resource. In another example, the request is an IAM request, and the API server issues webhook callback(s) to the isolation enforcer for authentication and/or authorization of the request. Specifically, the API server first issues a webhook callback to the authentication handler of the isolation enforcer. The API server may share information with the authentication handler using a token review resource. After the authentication handler allows the request, the authentication handler returns information to the API server using the token review resource and the API server issues a webhook callback to the authorization handler. The API server may share information with the authorization handler using a subject access review resource. Information that the authentication handler returned to the API server using the token review resource may be passed to the authorization handler by the API server using the subject access review resource.

In an embodiment, the system evaluates the request received by the API server to determine if the request is attempting to breach the isolation imposed by the isolation namespace (Operation 714). The isolation enforcer determines that the request is not prohibited by the isolation namespace by confirming that the target namespace corresponds to the isolation namespace. In an example, the request is a service account request. The service account request is evaluated by custom logic of the authorization handler. To evaluate the request, the authorization handler obtains the new namespace metadata from the local CND as well as information presented in a subject access review resource. In this example, the authorization handler determines that the originating namespace corresponds to the isolation namespace. Having determined that the originating namespace corresponds to the isolation namespace, the authorization handler confirms that the target namespace is the originating namespace and allows the request. In another example, the request is an IAM request. The IAM request is evaluated by custom logic of the authentication handler and the authorization handler. To evaluate the request, the authentication handler and authorization handler obtain the new namespace metadata from the local CND, obtain information presented in a token review resource and subject access review resource, and consult with an identity and access manager of the system. In this example, the authentication handler identifies a particular namespace that corresponds to the isolation namespace, confirms that the requesting entity is permitted to access the isolation namespace, and allows the request. Once the authentication handler allows the request, the authorization handler confirms that the isolation namespace corresponds to the target namespace by comparing the target namespace to the particular namespace. Having confirmed that the isolation namespace corresponds to the target namespace, the authorization handler allows the request.

It should be understood that a request that is not attempting to breach the isolation imposed by the isolation namespace may nonetheless be denied. For example, the system may still deny the request from the requesting entity if the requesting entity has not been granted a permission that allows the request.

6. ENFORCING ISOLATION

Figure 8:
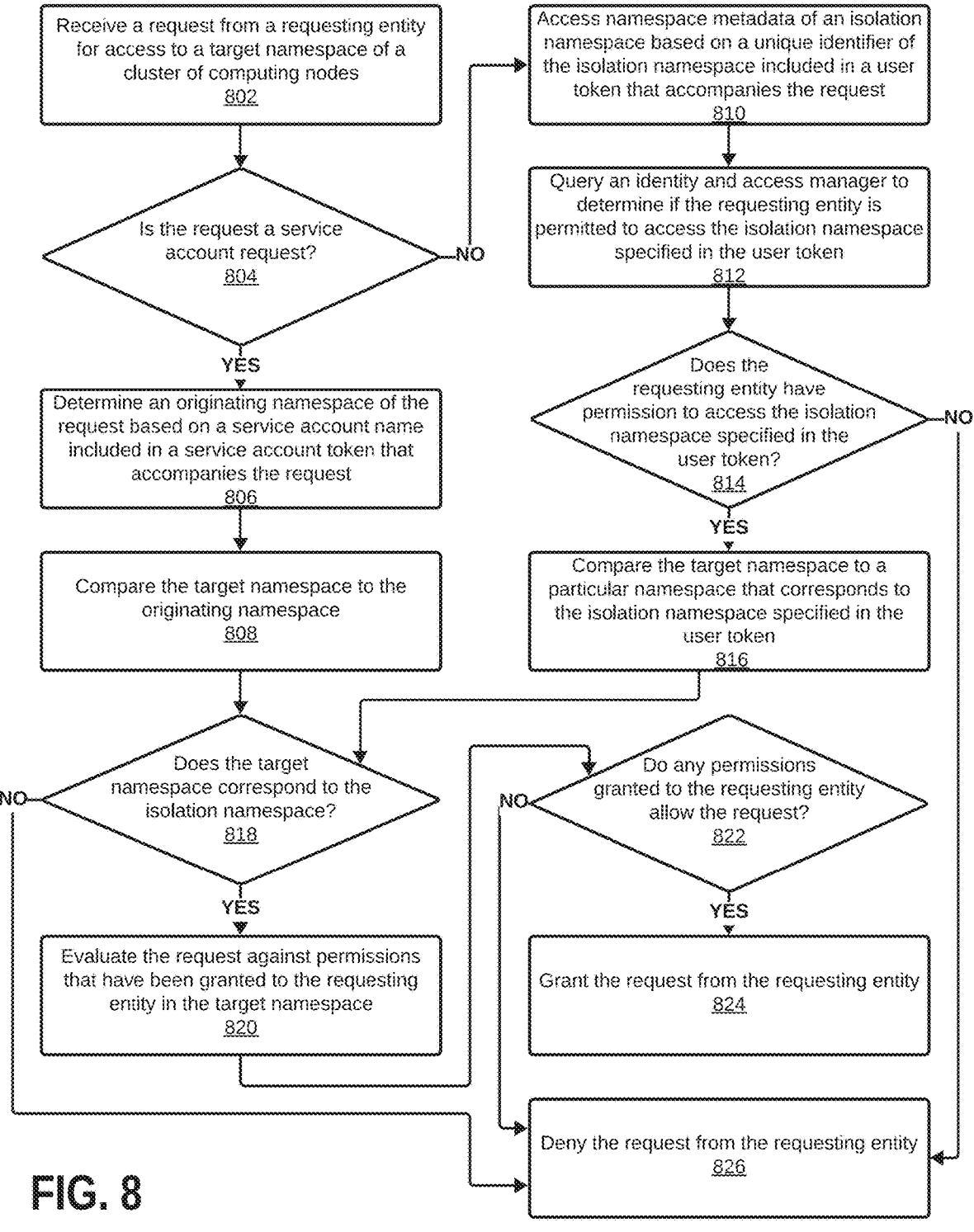
FIG. 8 illustrates an example set of operations for enforcing isolation in accordance with one or more embodiments.

FIG. 8 illustrates an example set of operations for enforcing isolation in accordance with one or more embodiments. One or more operations illustrated in FIG. 8 may be modified, rearranged, or omitted. Accordingly, the particular sequence of operations illustrated in FIG. 8 should not be construed as limiting the scope of one or more embodiments.

In an embodiment, the system receives a request from a requesting entity for access to a target namespace of a cluster of computing nodes configured for executing containerized applications (Operation 802). The requesting entity is a human user or a non-human user of the cluster. The request is a service account request or an IAM request. The request is accompanied by a service account token or a user token. In an example, an API server residing in a manager instance of the system receives the request. The request is an HTTP request, and the token is a JSON web token that is included in the header of the request. The request may identify the target namespace, a target resource, a resource type, a type of access that is being requested, the identity of the requesting entity, and/or other information.

In an embodiment, the system proceeds to another operation based on the type of the request that is received from the requesting entity (Operation 804). If the request is a service account request (YES in Operation 804), the system proceeds to Operation 806. In an example of this scenario, the API server issues a webhook callback to an authorization handler. The API server may share information with the authorization handler using a subject access review resource. Alternatively, if the request is an IAM request (NO in Operation 804), the system proceeds to Operation 808. In an example of this scenario, the API server issues a webhook callback to an authentication handler. The API server may share information with the authentication handler using a token review resource.

In an embodiment, the request is a service account request, the token is a service account token, and the system determines an originating namespace of the request (Operation 806). In this scenario, the requesting entity is a non-human user. In particular, the requesting entity is a component of the cluster that is associated with a standard namespace (e.g., a containerized application executing in a pod). The standard namespace of the requesting entity is the originating namespace. The service account token that accompanies the request includes a service account name. The system determines the originating namespace based on the service account name. In an example, the request is attempting to access a target resource, and an authorization handler of the system determines the originating namespace based on the service account name in response to receiving a webhook callback from a local API server. The service account name is indicative of the originating namespace because the service account name includes the name of the originating namespace. Thus, the authorization handler is able to determine the originating namespace by identifying the name of the originating namespace within the service account name. The authorization handler obtains the service account name from a subject access review resource. In addition to the service account name, the subject access review resource includes a name of the target namespace, a type of access that the request is attempting on the target resource (e.g., get), a resource type of a target resource (e.g., pods), and/or other information. The information presented in the subject access review resource was populated to the subject access review resource by an API server and/or another component of the system. Information presented in the subject access review resource was obtained from attributes of the request, the service account token, and/or other sources.

In an embodiment, the system compares the target namespace to the originating namespace (Operation 808). Prior to comparing the target namespace to the originating namespace, the system confirms that the originating namespace corresponds to an isolation namespace. The system confirms that the originating namespace corresponds to an isolation namespace based on namespace metadata that is associated with the originating namespace. In an example, an authorization handler of the system obtains the namespace metadata from a CND that resides in the same manager instance as the authorization handler. Specifically, the authorization handler checks the CND for any unique identifiers of an isolation namespace (e.g., a name and/or ID) that corresponds to the originating namespace. The authorization handler accesses the namespace metadata based on a name of the originating namespace. In this example, the authorization handler determined the name of the originating namespace based on a service account name that was obtained the from a subject access review resource.

Having confirmed that the originating namespace has a corresponding isolation namespace, the system will deny the request if the request is attempting to access any standard namespace other than the originating namespace. Thus, to determine if the request is to be denied, the system compares the target namespace to the originating namespace. In an example, an authorization handler compares a name of the target namespace to a name of the originating namespace. The authorization handler obtains the name of the target namespace from a subject access review resource. In this example, the authorization handler determined the name of the originating namespace based on a service account name that was also obtained from the subject access review resource.

In an embodiment, the request is an IAM request, the token is a user token, and the system accesses namespace metadata associated with an isolation namespace that is specified in the user token (Operation 810). In this scenario, the requesting entity is a human user or a non-human user. Prior to accessing the namespace metadata, the system verifies that the isolation namespace specified in the user token is associated with the cluster. Had the isolation namespace not been associated with the cluster (e.g., if the isolation namespace were associated with a different cluster), the system would have rejected the request. In an example, an authentication handler of the system verifies that the isolation namespace is associated with the cluster based on an ID of the isolation namespace. The ID of the isolation namespace is included in a URL of the isolation namespace. The URL of the isolation namespace is included in a signature (e.g., a Cavage signature) of the user token that accompanied the request. The authentication handler obtains the signature from a token review resource. The signature was populated to the token review resource by an API server that received the request.

Having verified that the isolation namespace is associated with the cluster, the system accesses namespace metadata associated with the isolation namespace. In an example, an authentication handler of the system obtains the namespace metadata from a CND residing on the same manager instance as the authentication handler. The authentication handler uses an ID of the isolation namespace to access the namespace metadata. In this example, the authentication handler obtained the ID of the isolation namespace from a signature of the user token. The authentication handler accesses namespace metadata such as a name of the isolation namespace, a compartment ID of the isolation namespace, a tag slug of the isolation namespace, a name of a particular namespace corresponding to the isolation namespace, and/or other information. The ID of the isolation namespace is indicative of the particular namespace that corresponds to the isolation namespace because the authentication handler identifies the particular namespace based on the ID of the isolation namespace.

In an embodiment, the system determines if the requesting entity has permission to access the isolation namespace (Operation 812). In particular, the system checks to determine if any IAM policies permit the requesting entity to access the isolation namespace. In an example, an authentication handler of the system queries an identity and access manager of the system based on namespace metadata that the authentication handler obtained from a CND (e.g., the name of the isolation namespace, the compartment ID of the isolation namespace, the tag slug of the isolation namespace, etc.). In particular, the authentication handler consults with the identity and access manager to determine if the requesting entity is a principal that has been granted a use permission for the isolation namespace and/or a manage permission for the isolation namespace. If the requesting entity does not have a use permission or a manage permission for the isolation namespace, the authentication handler may deny the request. Additionally, or alternatively, the authentication handler may consult with the identity and access manager to determine if the requesting entity has a use permission or a manage permission for the cluster. If the requesting entity has a use permission or a manage permission for the cluster, the requesting entity may be free to access any isolation namespace of the cluster.

If an IAM policy grants the requesting entity permission to access the isolation namespace (e.g., a use or manage permission), the system may allow the request to be authenticated. In an example, an authentication handler of the system responds to an API server to indicate a successful authentication of the request. Furthermore, the authentication handler provides information to the API server that may be used to further process the request. The authentication handler returns information to the API server by populating the information to a token review resource. In this example, the authentication handler may populate a user ID of the requesting entity, IDs or names of any groups that the requesting entity is a member of, an ID of the isolation namespace, and/or a name of the particular namespace to the token review resource.

The system may determine groups that the requesting entity is a member of based on any permissions that are granted to the requesting entity by IAM policies. In an example, a use permission for the isolation namespace is mapped to a user group of a particular namespace, and a manage permission for the isolation namespace is mapped to an administrator group of the particular namespace. If the requesting entity has a use permission for the isolation namespace, an authentication handler concludes that the requesting entity is a member of the user group for the particular namespace and populates an ID of the user group to a token review resource. If the requesting entity has a manage permission for the isolation namespace, the authentication handler concludes that the requesting entity is a member of the administrator group for the particular namespace and populates an ID of the administrator group to the token review resource. Additionally, or alternatively, the authentication handler may determine groups of the cluster that the requesting entity is a member of. For instance, a use permission for the cluster may be mapped to a user group of the cluster, and a manage permission for the cluster may be mapped to a master group of the cluster.

In an embodiment, the system proceeds to another operation based on whether or not the requesting entity has permission to access the isolation namespace (Operation 814). If the requesting entity has permission to access the isolation namespace specified in the user token that accompanies the request (YES in Operation 814), the system proceeds to Operation 816. In this scenario, the request is successfully authenticated, and the system proceeds to evaluate the request for authorization. In an example of this scenario, an API server issues a webhook callback to an authorization handler. The API server shares information with the authorization handler using a subject access review resource. The API server includes information returned by an authentication handler in the subject access review resource along with other information that may be used to evaluate the request for authorization. For instance, the subject access review resource may include a name of the target namespace, a type of access that the request is attempting on a target resource (e.g., get), a resource type of the target resource (e.g., pods), a user ID of the requesting entity, IDs and/or names of any groups that the requesting entity is a member of (e.g., a user group or administrator group for a particular namespace), an ID of the isolation namespace, a name of a particular namespace, and/or other information. Alternatively, if the requesting entity does not have permission to access the isolation namespace specified in the user token that accompanies the request (NO in Operation 814), the system proceeds to Operation 826. In this scenario, the system refuses to authenticate the request.

In an embodiment, the system compares the target namespace to a particular namespace (Operation 816). Prior to the comparison, the system confirms that the particular namespace corresponds to the isolation namespace specified in the user token. In an example, an authorization handler of the system access namespace metadata contained within a CND existing in the same manager instance as the authorization handler to confirm that the particular namespace corresponds to the isolation namespace. The authorization handler access the namespace metadata based on a name of the particular namespace. The authorization handler obtains the name of the particular namespace from a subject access review resource.

Having confirmed that the particular namespace corresponds to the isolation namespace, the system compares the target namespace to the particular namespace. In an example, an authorization handler of the system compares a name of the target namespace to a name of the particular namespace. The authorization handler obtains the name of the target namespace from a subject access review resource. The authorization handler also obtained the name of the particular namespace from the subject access review resource. If the target namespace is not the particular namespace, the authorization handler denies the request. If the target namespace is the particular namespace, the authorization handler may allow the request.

In an embodiment, the system proceeds to another operation based on whether or not the isolation namespace corresponds to the target namespace (Operation 818). If the target namespace corresponds to the isolation namespace (YES in Operation 818), the system proceeds to Operation 820. In an example of this scenario, the request is a service account request, and the target namespace is the originating namespace that is indicated by the service account token that accompanies the request. In another example of this scenario, the request is an IAM request, and the target namespace is the particular namespace that corresponds to the isolation namespace that is specified in the user token that accompanies the request. Alternatively, if the target namespace does not correspond to the isolation namespace (NO in Operation 818), the system proceeds to Operation 826. In an example of this scenario, the request is a service account request, and the target namespace is not the originating namespace indicated by the service account token that accompanies the request. In another example of this scenario, the request is an IAM request, and the target namespace is not the particular namespace that corresponds to the isolation namespace that is specified in the user token that accompanies the request.

In an embodiment, the system determines if the request is allowed by any permissions granted to the requesting entity (Operation 820). The permissions granted to the requesting entity may derive from IAM policies, RBAC policies, ABAC policies, node authorization policies, and/or other access control mechanisms. Whether or not any permissions of the requesting entity allows the request may be determined by an API server, an authentication handler, an authorization handler, and/or another component of the system. In an example, the system denies the request because the permissions of the requesting entity do not allow access to the target namespace, do not allow access to a target resource in the target namespace, do not allow the type of access that is specified in the request, and/or do not allow some other aspect of the request.

The system may determine permissions of the requesting entity based on group memberships of the requesting entity. In an example, the request is an IAM request, and the system checks a subject access review resource to determine if the requesting entity is a member of a user group for the particular namespace. In this example, the user group for the particular namespace is bound to a user RBAC role for the particular namespace. The user RBAC role grants a limited set of permissions within the particular namespace. Additionally, the system checks the subject access review resource to determine if the requesting entity is a member of an administrator group for the particular namespace. In this example, the administrator group for the particular namespace is bound to an administrator RBAC role for the particular namespace. The administrator RBAC role grants administrator-level permissions within the particular namespace. If the additive permissions granted by any RBAC roles of the requesting entity do not allow for the request, the system denies the request. In another example, the request is a service account request, and the system may determine permissions of the requesting entity based on the group memberships of the service account.

The access control mechanisms that define the permissions of the requesting may be configured such that certain commands are prohibited to the requesting entity. In an example, the system prevents the requesting entity from invoking verbs that might allow the requesting entity to escape the isolation imposed by the isolation namespace. In this example, the prohibited verbs are those that would allow the requesting entity to impersonate a resource, bind an RBAC cluster role or an RBAC role, and/or escalate an RBAC cluster role or RBAC role. An RBAC cluster role and/or RBAC role may prohibit a verb by not granting a permission to use the verb.

In an embodiment, the system proceeds to another operation based on whether or not a permission granted to the requesting entity allows the request (Operation 822). If a permission granted to the requesting entity allows the request (YES in Operation 822), the system proceeds to Operation 824. Alternatively, if no permissions granted to the requesting entity allow the request (NO in Operation 822), the system proceeds to Operation 826.

In an embodiment, the system grants the request from the requesting entity for access to the target namespace (Operation 824). As a result, the API server of the system performs the request and returns the result of the request to the requesting entity. In an example, the system grants a request because (a) the request is not attempting to breach the isolation imposed by an isolation namespace and (b) the request is allowed by a permission that is granted to the requesting entity.

In an embodiment, the system denies the request from the requesting entity for access to the target namespace (Operation 826). Consequently, the API server of the system issues a message indicating a denial of the request. In an example, an authorization handler denies the request because the requesting entity is attempting to use a service account request to escape the boundaries of an isolation namespace (i.e., the target namespace is not the originating namespace indicated by the service account token). In another example, an authentication handler denies the request because the request is an IAM request that is attempting to access an isolation namespace that the requesting entity is not permitted to access (i.e., an IAM policy does not grant the requesting entity a permission to access the isolation namespace specified by the user token). In yet another example, the authorization handler denies the request because the request is an IAM request that is attempting to access a standard namespace that is different than the standard namespace the request was authenticated for (i.e., the target namespace does not correspond to the isolation namespace that the requesting entity specified in the user token). In yet another example, the system denies the request because the requesting entity has not been granted a permission that allows the request.

7. EXAMPLE EMBODIMENT

A detailed example is described below for purposes of clarity. Components and/or operations described below should be understood as one specific example that may not be applicable to certain embodiments. Accordingly, components and/or operations described below should not be construed as limiting the scope of any of the claims.

Figure 9:
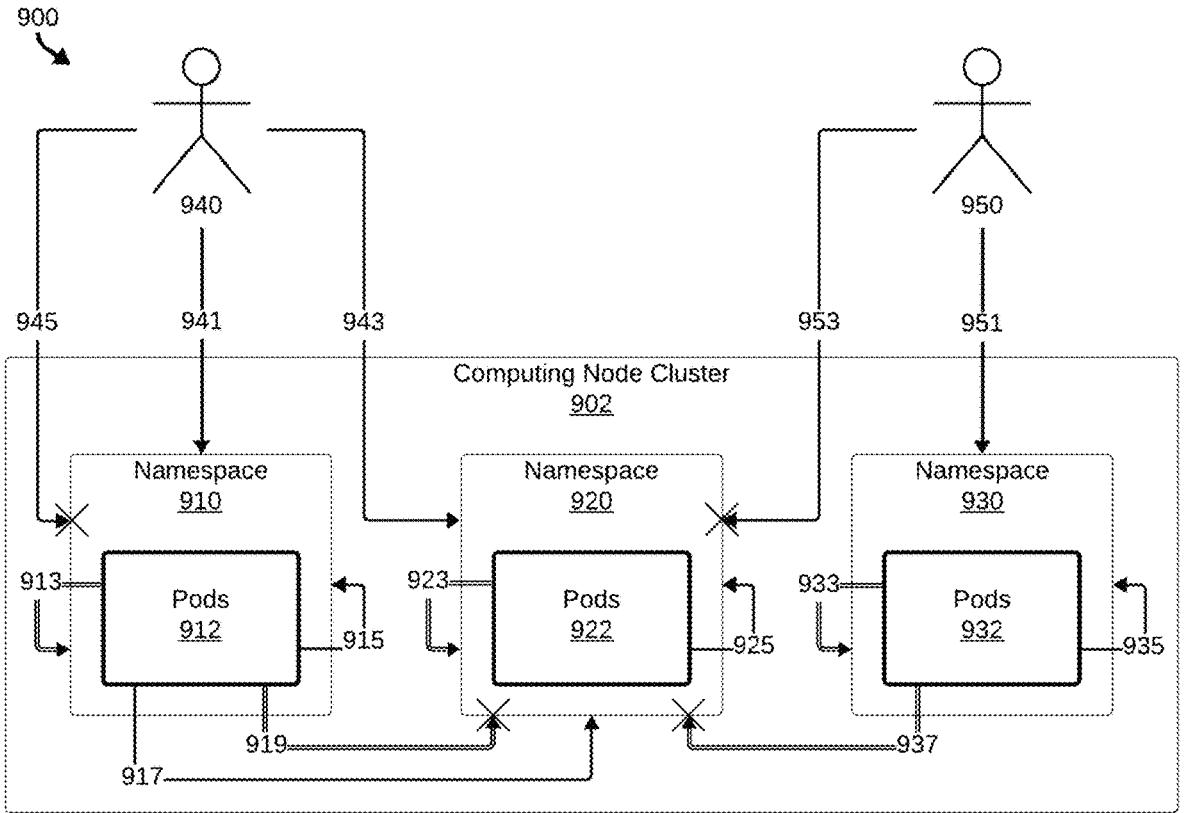
FIG. 9 illustrates an example computer environment that implements isolation namespaces in accordance with one or more embodiments.

FIG. 9 illustrates an example computer network 900 that implements isolation namespaces in accordance with one or more embodiments. As illustrated in FIG. 9, computer network 900 includes computing node cluster 902. In one or more embodiments, the computer network 900 may include more or fewer components than the components illustrated in FIG. 9. The components illustrated in FIG. 9 may be local to or remote from each other. The components illustrated in FIG. 9 may be implemented in software and/or hardware. Each component may be distributed over multiple applications and/or machines. Multiple components may be combined into one application and/or machine. Operations described with respect to one component may instead be performed by another component.

In an embodiment, computing node cluster 902 is a cluster of computing nodes configured for executing containerized applications. Portions of computing node cluster 902 are vended to human user 940 and human user 950. As illustrated in FIG. 9, resources of computing node cluster 902 are organized into namespace 910, namespace 920, and namespace 930. Namespace 910, namespace 920, and namespace 930 are standard namespaces.

In an embodiment, namespace 910 corresponds to an isolation namespace. Namespace 910 includes resources such as pods 912. Service account token(s) are mounted to pods 912. The service account tokens are associated with service accounts. Service account(s) and/or other identities of namespace 910 are principals that are attached to IAM policies written against isolation namespaces. Specifically, an IAM policy permits a containerized application executing in pod 912 to access an isolation namespace corresponding to namespace 910. Furthermore, an IAM policy permits a containerized application executing in pod 912 to access an isolation namespace corresponding to namespace 920.

In an embodiment, a containerized application executing in a pod 912 requests access to namespace 910 via service account request 913. Specifically, service account request 913 requests access to a target resource of namespace 910. Service account request 913 is accompanied by a service account token. The service account token includes a service account name. Based on the service account name, an authorization handler determines that namespace 910 is also the originating namespace (i.e., service account request 913 originates from namespace 910). The authorization handler allows service account request 913 because the target namespace is the originating namespace. The service account is bound to an RBAC role for namespace 910. The RBAC role grants a set of permissions within namespace 910. The permissions granted by the RBAC role allow for service account request 913 (i.e., the RBAC role permits access to the target resource with the type of access that is being requested by service account request 913). The system grants service account request 913.

In an embodiment, a containerized application executing in a pod 912 requests access to a standard namespace 910 via IAM request 915. A user token accompanies IAM request 915. The user token includes a signature, and the signature includes an ID of an isolation namespace. An authentication handler allows IAM request 915 because the authentication handler determines that an IAM policy permits the containerized application 912 to access the isolation namespace specified by the user token. An authorization handler determines that the isolation namespace specified by the user token corresponds to the target namespace (i.e., namespace 910). As a result, the authorization handler also allows IAM request 915. A permission granted by an IAM policy that allows the containerized application to access the isolation namespace is mapped to an RBAC role of namespace 910. The RBAC role grants a set of permissions within namespace 910. The set of permissions granted by the RBAC role allow for IAM request 915. The system grants IAM request 915.

In an embodiment, a containerized application executing in a pod 912 requests access to namespace 920 via IAM request 917. A user token accompanies IAM request 917. The user token includes a signature, and the signature includes an ID of an isolation namespace. An authentication handler allows IAM request 917 because the authentication handler determines that an IAM policy permits the containerized application to access the isolation namespace specified by the user token. An authorization handler determines that the isolation namespace specified by the user token corresponds to the target namespace (i.e., namespace 920). As a result, the authorization handler also allows IAM request 917. A permission granted by an IAM policy that allows the containerized application to access the isolation namespace is mapped to an RBAC role of namespace 920. The RBAC role grants a set of permissions within namespace 920. The set of permissions granted by the RBAC role allow for IAM request 917. The system grants IAM request 917.

In an embodiment, a containerized application executing in a pod 912 requests access to namespace 920 via service account request 919. Service account request 919 is accompanied by a service account token. The service account token includes a service account name. Based on the service account name, an authorization handler determines that namespace 910 is the originating namespace. The authorization handler denies service account request 919 because the target namespace (i.e., namespace 920) is not the originating namespace (i.e., namespace 910). The authorization handler denies service account request 919 even if RBAC policies allow service account request 919.

In an embodiment, namespace 920 corresponds to an isolation namespace. Namespace 920 includes namespaced resources such as pods 922. Service account token(s) are mounted to pods 912. The service account tokens are associated with service accounts. Service account(s) and/or other identities of namespace 920 are principals that are attached to IAM policies that are written against isolation namespaces. Specifically, an IAM policy permits a containerized application executing in pod 922 to access an isolation namespace corresponding to namespace 920.

In an embodiment, a containerized application executing in a pod 922 requests access to namespace 920 via service account request 923. Service account request 923 is accompanied by a service account token. The service account token includes a service account name. Based on the service account name, an authorization handler determines that namespace 920 is also the originating namespace. The authorization handler allows service account request 923 because the target namespace is the originating namespace. The service account is bound to an RBAC role within namespace 920. The RBAC role grants a set of permissions within namespace 920. The permissions granted by the RBAC role allow for service account request 923. The system grants service account request 923.

In an embodiment, a containerized application executing in a pod 922 requests access to namespace 920 via IAM request 925. A user token accompanies IAM request 925. The user token includes a signature, and the signature includes an ID of an isolation namespace. An authentication handler allows IAM request 925 because the authentication handler determines that an IAM policy permits the containerized application to access the isolation namespace. An authorization handler determines that the isolation namespace specified by the user token corresponds to the target namespace. As a result, the authorization handler also allows IAM request 925. A permission granted by an IAM policy that allows the containerized application to access the isolation namespace is mapped to an RBAC role of namespace 920. The RBAC role grants a set of permissions within namespace 920. The set of permissions granted by the RBAC role allow for IAM request 925. The system grants IAM request 925.

In an embodiment, namespace 930 corresponds to an isolation namespace. Namespace 930 includes pods 932. Service account token(s) are mounted to pods 932. The service account tokens are associated with service accounts. Service account(s) and/or other identities of namespace 930 are principals that are attached to IAM policies written against isolation namespaces. Specifically, an IAM policy permits a containerized application executing in a pod 932 to access an isolation namespace corresponding to namespace 930.

In an embodiment, a containerized application executing in a pod 932 requests access to namespace 930 via service account request 933. Service account request 933 is accompanied by a service account token. The service account token includes a service account name. Based on the service account name, an authorization handler determines that namespace 930 is also the originating namespace. The authorization handler allows service account request 933 because the target namespace is the originating namespace. The service account is bound to an RBAC role within namespace 930. The RBAC role grants a set of permissions within namespace 930. The permissions granted by the RBAC role allow for service account request 933. The system grants service account request 933.

In an embodiment, a containerized application executing in a pod 932 requests access to namespace 930 via IAM request 935. A user token accompanies IAM request 935. The user token includes a signature, and the signature includes an ID of an isolation namespace. An authentication handler allows IAM request 935 because the authentication handler determines that an IAM policy permits the containerized application to access the isolation namespace specified by the user token. An authorization handler determines that the isolation namespace specified by the user token corresponds to the target namespace. As a result, the authorization handler also allows IAM request 935. A permission granted by an IAM policy that allows the containerized application to access the isolation namespace corresponding to namespace 930 is mapped to an RBAC role of namespace

930. The RBAC role grants a set of permissions within namespace 930. The set of permissions granted by the RBAC role allows for IAM request 935. The system grants IAM request 935.

In an embodiment, a containerized application executing in a pod 932 requests access to namespace 920 via service account request 937. Service account request 937 is accompanied by a service account token. The service account token includes a service account name. Based on the service account name, an authorization handler determines that namespace 930 is the originating namespace. The authorization handler denies service account request 937 because the target namespace is not the originating namespace.

In an embodiment, human user 940 is vended a portion of computing node cluster 902. In particular, human user 940 is vended namespace 910 and namespace 920. Human user 940 is a principal that is attached to IAM policies permitting human user 940 to access an isolation namespace corresponding to namespace 910 and another isolation namespace corresponding to namespace 920.

In an embodiment, human user 940 requests access to namespace 910 via IAM request 941. A user token generated by human user 940 accompanies IAM request 941. The user token includes a signature, and the signature includes an ID of an isolation namespace. An authentication handler allows IAM request 941 because the authentication handler determines that an IAM policy permits human user 940 to access the isolation namespace specified by the user token. An authorization handler determines that the isolation namespace specified by the user token corresponds to the target namespace. As a result, the authorization hander also allows IAM request 941. A permission allowing access to the isolation namespace that is granted to human user 940 by an IAM policy is mapped to an RBAC role of namespace 910. The RBAC role grants a set of permissions within namespace 910. The set of permissions granted by the RBAC role allow for IAM request 941. The system grants IAM request 941.

In an embodiment, human user 940 requests access to namespace 920 via IAM request 943. A user token generated by human user 940 accompanies IAM request 943. The user token includes a signature, and the signature includes a unique identifier of an isolation namespace. An authentication handler allows IAM request 943 because the authentication handler determines that an IAM policy permits human user 940 to access the isolation namespace specified by the user token. An authorization handler determines that the isolation namespace specified by the user token corresponds to the target namespace (i.e., namespace 920). As a result, the authorization hander also allows IAM request 943. A permission allowing access to the isolation namespace that is granted to human user 940 by an IAM policy is mapped to an RBAC role of namespace 920. The RBAC role grants a set of permissions within namespace 920. The set of permissions granted by the RBAC role allow for IAM request 943. The system grants IAM request 943.

In an embodiment, human user 940 requests access to namespace 910 via IAM request 945. Specifically, human user 940 requests access to a target resource of namespace 910. A user token generated by human user 940 accompanies IAM request 945. The user token includes a signature, and the signature includes an ID of an isolation namespace. An authentication handler allows IAM request 945 because the authentication handler determines that an IAM policy permits human user 940 to access the isolation namespace specified by the user token. An authorization handler determines that the isolation namespace specified by the user token corresponds to the target namespace. As a result, the authorization hander also allows IAM request 945. A permission allowing access to the isolation namespace that is granted to human user 940 by an IAM policy is mapped to an RBAC role of namespace 910. The RBAC role grants a set of permissions within namespace 910. The permissions granted by the RBAC role do not allow IAM request 945. For instance, it may be that the permissions granted by the RBAC role do not allow human user 940 to access the target resource and/or that human user 940 is attempting to invoke a verb that is prohibited to human user 940 (e.g., impersonate, bind, and/or escalate). Consequently, the system denies IAM request 945.

In an embodiment, human user 950 is vended a portion of computing node cluster 902. In particular, human user 950 is vended namespace 930. Human user 950 is a principal that is attached to IAM policies permitting human user 950 to access an isolation namespace corresponding to namespace 930.

In an embodiment, human user 950 requests access to namespace 930 via IAM request 951. A user token generated by human user 950 accompanies IAM request 951. The user token includes a signature, and the signature includes an ID of an isolation namespace. An authentication handler allows IAM request 951 because the authentication handler determines that an IAM policy permits human user 950 to access the isolation namespace specified by the user token. An authorization handler determines that the isolation namespace specified by the user token corresponds to the target namespace (i.e., namespace 930). As a result, the authorization hander also allows IAM request 951. A permission allowing access to the isolation namespace that is granted to human user 950 by an IAM policy is mapped to an RBAC role of namespace 930. The RBAC role grants a set of permissions within namespace 930. The set of permissions granted by the RBAC role allow for IAM request 951. The system grants IAM request 951.

In an embodiment, human user 950 requests access to namespace 920 via IAM request 953. A user token generated by human user 950 accompanies IAM request 953. The user token includes a signature, and the signature includes an ID of an isolation namespace that corresponds to namespace 930. An authentication handler allows IAM request 953 because the authentication handler determines that an IAM policy permits human user 950 to access the isolation namespace that corresponds to namespace 930. However, an authorization handler determines that the isolation namespace specified by the user token (i.e., the isolation namespace corresponding to namespace 930) does not correspond to the target namespace (i.e., namespace 920). Consequently, the authorization handler denies IAM request 953. The authorization handler denies IAM request 953 even if RBAC policies permit human user 950 access to namespace 920.

8. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner that might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application, in the specific form in that such claims issue, including any subsequent correction.

What is claimed is:

1. A method, comprising:
receiving (a) a first request for access to a first target namespace and (b) a first token corresponding to the first request, the first token identifying a first namespace as an origin namespace for the first request based, at least in part, on the first token comprising a first identifier referencing the first namespace,
wherein the first target namespace is comprised within a cluster of computing nodes configured for executing containerized applications;
based on the first identifier referencing the first namespace, accessing namespace metadata associated with the first namespace;
based on the namespace metadata, determining that the first namespace is associated with a corresponding first isolation namespace;
responsive to determining that the first namespace corresponds to the first isolation namespace, prohibiting requests originating from the first namespace to access any namespace other than the first namespace, wherein prohibiting the requests comprises:
comparing the first target namespace to the first namespace to determine that the first target namespace is not the first namespace; and
responsive to determining that the first target namespace is not the first namespace, declining the first request for access to the first target namespace,
wherein the method is performed by at least one device including a hardware processor.

2. The method of claim 1, further comprising:
prior to determining that the first target namespace is not the first namespace:
identifying the first identifier comprised within the first token,
wherein the first request originates from the first namespace, the first token is a service account token comprising a name of a service account, and the name of the service account comprises the first identifier.

3. The method of claim 2, further comprising:

accessing namespace metadata associated with the first namespace from a datastore of the cluster of computing nodes based on the first identifier, wherein the first identifier is a name of the first namespace; and determining, based on the namespace metadata associated with the first namespace, that the first namespace corresponds to a first isolation namespace.

4. The method of claim 1, wherein the first request is attempting to access a first target resource comprised within the first target namespace, wherein the first request originates from a first requesting entity, wherein a first set of one or more permissions associated with the first requesting entity allows the first requesting entity to access the first target resource, and wherein the first set of one or more permissions comprises a first permission that is granted by an identity and access management policy, a role-based access control policy, an attribute-based access control policy, and/or a node authorization policy.

5. The method of claim 1, further comprising:

receiving (a) a second request for access to a second target namespace and (b) a second token corresponding to the second request, the second token comprising a second identifier, wherein the second request originates from a second requesting entity, and the second target namespace is comprised within the cluster of computing nodes configured for executing the containerized applications;

identifying a second namespace based on the second identifier;

based on a comparison of the second target namespace to the second namespace, determining that the second target namespace is the second namespace;

evaluating the second request against a second set of one or more permissions associated with the second requesting entity to determine if the second request is allowed by the second set of one or more permissions; and responsive to determining that the second request is not allowed by the second set of one or more permissions, declining the second request for access to the second target namespace.

6. The method of claim 1, further comprising:

receiving (a) a second request for access to a second target namespace and (b) a second token corresponding to the second request, the second token comprising a second identifier, wherein the second target namespace is comprised within the cluster of computing nodes configured for executing the containerized applications;

identifying a second namespace based on the second identifier;

based on a comparison of the second target namespace to the second namespace, determining that the second target namespace is the second namespace; and authorizing the second request for access to the second target namespace.

7. The method of claim 1, wherein the namespace metadata is accessed from a namespace data store.

8. The method of claim 1, wherein the first target namespace and the first namespace are standard namespaces.

9. The method of claim 1, wherein identifying the first namespace as the origin namespace comprises identifying the first namespace as originating from the first namespace.

10. A method, comprising:

receiving (a) a first request for access to a first target namespace and (b) a first token corresponding to the first request, the first token comprising a first identifier referencing a first isolation namespace, wherein the first target namespace is comprised within a cluster of computing nodes configured for executing containerized applications;

based on the first identifier referencing the first isolation namespace, accessing namespace metadata associated with the first isolation namespace;

based on the namespace metadata, identifying a corresponding first namespace that is associated with the first isolation namespace;

based on (a) the first token comprising the first identifier referencing the first isolation namespace and (b) the first isolation namespace being associated with the first namespace, prohibiting the first request from accessing any namespace other than the first namespace that is associated with the first isolation namespace, wherein prohibiting the first request comprises:

comparing the first target namespace to the first namespace to determine that the first target namespace is not the first namespace; and responsive to determining that the first target namespace is not the first namespace, declining the first request for access to the first target namespace, wherein the method is performed by at least one device including a hardware processor.

11. The method of claim 10, further comprising:

prior to determining that the first target namespace is not the first namespace:

accessing namespace metadata associated with the first isolation namespace from a datastore of the cluster of computing nodes based on the first identifier comprised within the first token, wherein the first namespace that corresponds to the first isolation namespace is identified based on the namespace metadata associated with the first isolation namespace;

querying, based on the first identifier and/or the namespace metadata associated with the first isolation namespace, an access management service to determine if a first requesting entity corresponding to the first request is authorized to access the first isolation namespace; and based on querying the access management service, determining that the first requesting entity is authorized to access the first isolation namespace.

12. The method of claim 10, wherein the first request is attempting to access a first target resource comprised within the first target namespace, wherein the first request originates from a first requesting entity, wherein a first set of one or more permissions associated with the first requesting entity allows the first requesting entity to access the first target resource, and wherein the first set of one or more permissions comprises a first permission that is granted by an identity and access management policy, a role-based access control policy, an attribute-based access control policy, and/or a node authorization policy.

13. The method of claim 10, further comprising:

receiving (a) a second request for access to a second target namespace and (b) a second token corresponding to the second request, the second token comprising a second identifier referencing a second isolation namespace, wherein the second request originates from a second requesting entity, and the second target namespace is comprised within the cluster of computing nodes configured for executing the containerized applications;

identifying a second namespace that corresponds to the second isolation namespace;

querying an access management service to determine if the second requesting entity corresponding to the second request is authorized to access the second isolation namespace; and responsive to determining that the second requesting entity is not authorized to access the second isolation namespace, declining the second request for access to the second target namespace.

14. The method of claim 10, further comprising:

receiving (a) a second request for access to a second target namespace and (b) a second token corresponding to the second request, the second token comprising a second identifier, wherein the second request originates from a second requesting entity, and the second target namespace is comprised within the cluster of computing nodes configured for executing the containerized applications;

identifying a second namespace based on the second identifier;

based on a comparison of the second target namespace to the second namespace, determining that the second target namespace is the second namespace;

evaluating the second request against a second set of one or more permissions associated with the second requesting entity to determine if the second request is allowed by the second set of one or more permissions; and responsive to determining that the second request is not allowed by the second set of one or more permissions, declining the second request for access to the second target namespace.

15. The method of claim 10, further comprising:

receiving (a) a second request for access to a second target namespace and (b) a second token corresponding to the second request, the second token comprising a second identifier, wherein the second request originates from a second requesting entity, and the second target namespace is comprised within the cluster of computing nodes configured for executing the containerized applications;

identifying a second namespace based on the second identifier;

based on a comparison of the second target namespace to the second namespace, determining that the second target namespace is the second namespace; and authorizing the second request for access to the second target namespace.

16. The method of claim 10, wherein the namespace metadata is accessed from a namespace data store.

17. The method of claim 10, wherein the first target namespace and the first namespace are standard namespaces.

18. One or more non-transitory computer-readable media comprising instructions that, when executed by one or more hardware processors, cause performance of operations comprising:

receiving (a) a first request for access to a first target namespace and (b) a first token corresponding to the first request, the first token identifying a first namespace as an origin namespace for the first request based, at least in part, on the first token comprising a first identifier referencing the first namespace, wherein the first target namespace is comprised within a cluster of computing nodes configured for executing containerized applications;

based on the first identifier referencing the first namespace, accessing namespace metadata associated with the first namespace;

based on the namespace metadata, determining that the first namespace is associated with a corresponding first isolation namespace;

responsive to determining that the first namespace corresponds to the first isolation namespace, prohibiting requests originating from the first namespace to access any namespace other than the first namespace, wherein prohibiting the requests comprises:

comparing the first target namespace to the first namespace to determine that the first target namespace is not the first namespace; and responsive to determining that the first target namespace is not the first namespace, declining the first request for access to the first target namespace.

19. The one or more non-transitory computer-readable media of claim 18, wherein the operations further comprise:

prior to determining that the first target namespace is not the first namespace:

identifying the first identifier comprised within the first token, wherein the first identifier is a name of the first namespace, the first request originates from the first namespace, the first token is a service account token comprising a name of a service account, and the name of the service account comprises the name of the first namespace;

accessing namespace metadata associated with the first namespace from a datastore of the cluster of computing nodes based on the name of the first namespace; and determining, based on the namespace metadata associated with the first namespace, that the first namespace corresponds to a first isolation namespace.

20. The one or more non-transitory computer-readable media of claim 18, wherein the first request is attempting to access a first target resource comprised within the first target namespace, wherein the first request originates from a first requesting entity, wherein a first set of one or more permissions associated with the first requesting entity allows the first requesting entity to access the first target resource, and wherein the first set of one or more permissions comprises a first permission that is granted by an identity and access management policy, a role-based access control policy, an attribute-based access control policy, and/or a node authorization policy.

21. The one or more non-transitory computer-readable media of claim 18, wherein the operations further comprise:

receiving (a) a second request for access to a second target namespace and (b) a second token corresponding to the second request, the second token comprising a second identifier, wherein the second request originates from a second requesting entity, and the second target namespace is comprised within the cluster of computing nodes configured for executing the containerized applications;

identifying a second namespace based on the second identifier;

based on a comparison of the second target namespace to the second namespace, determining that the second target namespace is the second namespace;

evaluating the second request against a second set of one or more permissions associated with the second requesting entity to determine if the second request is allowed by the second set of one or more permissions; and responsive to determining that the second request is not allowed by the second set of one or more permissions, declining the second request for access to the second target namespace.

22. One or more non-transitory computer-readable media comprising instructions that, when executed by one or more hardware processors, cause performance of operations comprising:

receiving (a) a first request for access to a first target namespace and (b) a first token corresponding to the first request, the first token comprising a first identifier referencing a first isolation namespace, wherein the first target namespace is comprised within a cluster of computing nodes configured for executing containerized applications;

based on the first identifier referencing the first isolation namespace, accessing namespace metadata associated with the first isolation namespace;

based on the namespace metadata, identifying a corresponding first namespace that is associated with the first isolation namespace;

based on (a) the first token comprising the first identifier referencing the first isolation namespace and (b) the first isolation namespace being associated with the first namespace, prohibiting the first request from accessing any namespace other than the first namespace that is associated with the first isolation namespace, wherein prohibiting the first request comprises:

comparing the first target namespace to the first namespace to determine that the first target namespace is not the first namespace; and responsive to determining that the first target namespace is not the first namespace, declining the first request for access to the first target namespace.

23. The one or more non-transitory computer-readable media of claim 22, wherein the operations further comprise:

prior to determining that the first target namespace is not the first namespace:

accessing namespace metadata associated with the first isolation namespace from a datastore of the cluster of computing nodes based on the first identifier comprised within the first token, wherein the first namespace that corresponds to the first isolation namespace is identified based on the namespace metadata associated with the first isolation namespace;

querying, based on the first identifier and/or the namespace metadata associated with the first isolation namespace, an access management service to determine if a first requesting entity corresponding to the first request is authorized to access the first isolation namespace; and based on querying the access management service, determining that the first requesting entity is authorized to access the first isolation namespace.

24. The one or more non-transitory computer-readable media of claim 22, wherein the first request is attempting to access a first target resource comprised within the first target namespace, wherein the first request originates from a first requesting entity, wherein a first set of one or more permissions associated with the first requesting entity allows the first requesting entity to access the first target resource, and wherein the first set of one or more permissions comprises a first permission that is granted by an identity and access management policy, a role-based access control policy, an attribute-based access control policy, and/or a node authorization policy.

25. The one or more non-transitory computer-readable media of claim 22, wherein the operations further comprise:

receiving (a) a second request for access to a second target namespace and (b) a second token corresponding to the second request, the second token comprising a second identifier, wherein the second request originates from a second requesting entity, and the second target namespace is comprised within the cluster of computing nodes configured for executing the containerized applications;

identifying a second namespace based on the second identifier;

based on a comparison of the second target namespace to the second namespace, determining that the second target namespace is the second namespace;

evaluating the second request against a second set of one or more permissions associated with the second requesting entity to determine if the second request is allowed by the second set of one or more permissions; and responsive to determining that the second request is not allowed by the second set of one or more permissions, declining the second request for access to the second target namespace.

\* \* \* \* \*